United States Patent [19]

Chiu

[11] Patent Number: 5,198,160
[45] Date of Patent: Mar. 30, 1993

[54] PROCESS FOR MAKING SPECKLED AND FOAMED PLASTIC ARTICLE

[76] Inventor: Ou-Yang Chiu, No. 31, Cheng-Kung San Rd., Nan-Kang Industrial Park, Nantu City, Taiwan

[21] Appl. No.: 837,167

[22] Filed: Feb. 18, 1992

Related U.S. Application Data

[63] Continuation-in-part of Ser. No. 598,897, Oct. 16, 1990, abandoned.

[51] Int. Cl.$^5$ .................... B29C 43/30; B29C 67/20
[52] U.S. Cl. .................... 264/28; 264/45.1; 264/46.1; 264/73; 264/76; 264/115; 264/122; 264/126
[58] Field of Search ............ 264/28, 45.1, 46.1, 264/73, 74, 75, 76, 77, 115, 122, 126, 245, 321

[56] References Cited

U.S. PATENT DOCUMENTS

| | | | |
|---|---|---|---|
| 1,975,515 | 10/1934 | Mayer | 264/122 |
| 2,044,585 | 6/1936 | Macht | 264/77 |
| 2,706,311 | 4/1955 | Durst et al. | 264/28 |
| 3,040,210 | 6/1962 | Charlton | 264/76 |
| 3,078,510 | 2/1963 | Rowe | 264/76 |
| 3,145,241 | 8/1964 | Powell | 264/76 |
| 3,263,010 | 7/1966 | Shultz | 264/321 |
| 3,832,429 | 8/1974 | Charpentier | 264/51 |
| 4,333,897 | 6/1982 | Hayashi et al. | 264/40.6 |
| 4,493,806 | 1/1985 | Hatzikelis et al. | 264/28 |
| 4,504,436 | 3/1985 | Louvier | 264/321 |
| 4,639,343 | 1/1987 | Long et al. | 264/45.5 |
| 4,923,658 | 5/1990 | Hover | 264/76 |

FOREIGN PATENT DOCUMENTS 56-4423 1/1981 Japan .................... 264/76

Primary Examiner—Mary Lynn Theisen
Attorney, Agent, or Firm—Ladas & Parry

[57] ABSTRACT

A novel process for fabricating a multi-colored foamed speckled thermoplastic sheet is disclosed, wherein differently colored preformed thermoplastic sheets are separately comminuted into particles by grinding the sheets at the temperature about equal to the glass-transition temperatures of the sheets. The ground fine particles of different colors are mixed in an appropriate ratio and are then calendered to form sheets. This process is economical and convenient for mass production.

1 Claim, 2 Drawing Sheets

PROCESS FOR MAKING SPECKLED AND FOAMED PLASTIC ARTICLE

This application is a continuation-in-part application of U.S. Pat. Application No. 07/598,897, filed on Oct. 16, 1990 which is now abandoned.

BACKGROUND OF THE INVENTION

This invention relates to a process for making a speckled pattern on a foamed plastic sheet, and particularly to a process for making speckled pattern on a foamed plastic sheet by mixing powdered plastic foams of different colors and forming the resultant mixture into a sheet.

BRIEF DESCRIPTION OF THE RELATED PRIOR ART

It is known that decorative materials or products with decorative patterns can be fabricated from thermoplastic materials by mixing differently colored thermoplastic particles in an appropriate ratio and then applying heat and pressure to combine them to form an article. U.S. Pat. No. 3,145,241 (Powell) discloses a method for producing a multicolored decorative sheet material having a non-directional decoration by supplying a mixture of differently colored granules of plastic composition to the nip of two calender rollers while simultaneously limiting the passage of the granules through the rolls. U.S. Pat. No. 4,923,658 (Hover et al) discloses a process wherein a starting material for forming the particles of thermoplastic synthetic resin is processed by a thermal pretreatment at a temperature above the softening temperature of the resin to form an agglomerate or granular mixture, and the mixture is mechanically comminuted into a finely particulated mixture having a random grain size distribution. This patent also discloses that fine particles can be produced by abrading a preformed resinous article. U.S. Pat. No. 3,263,010 discloses a method for the production of noncellular unitary structures from rigid polyurethane foam in which the rigid polyurethane foam is reduced to particles having a dimension of less than ⅜ inches. U.S. Pat. No. 4,333,897 discloses a method of molding a prefoamed particulate thermoplastic resin material in which the size of a prefoamed thermoplastic sheet article is reducing it into small pieces. U.S. Pat. No. 4,504,436 discloses that sheets or boards of polystyrene foam can be ground to a mesh of 5 to 7 mm and that, before grinding, the foam is precooled to a temperature lower than the melting temperature by air cooling.

SUMMARY OF THE PRESENT INVENTION

An object of this invention is to provide a novel process of fabricating a multi-colored foamed speckled thermoplastic sheet in which differently colored preformed thermoplastic sheets are separately comminuted into particles by grinding the sheets at the temperatures about the glass-transition temperatures of the sheets. This process is economical and convenient for mass production.

According to the present invention, a process for making speckled and foamed article comprising: preparing at least two differently colored thermoplastic foam compositions; forming at least two differently colored sheets from said foam compositions; cooling said sheets to the glass-transition temperatures of said sheets; grinding each of said sheets to form fine particles when the temperatures of said sheets are about equal to the glass-transition temperatures thereof; mixing said fine particles of said differently colored sheets in an appropriate ratio to form a desired pattern; and forming the mixture of said fine particles into a sheet.

The exemplary preferred embodiment of this invention will be described in detail with reference to the accompanying drawings.

DETAILED DESCRIPTION OF THE PREFERRED EMBODIMENT

Figure 1:
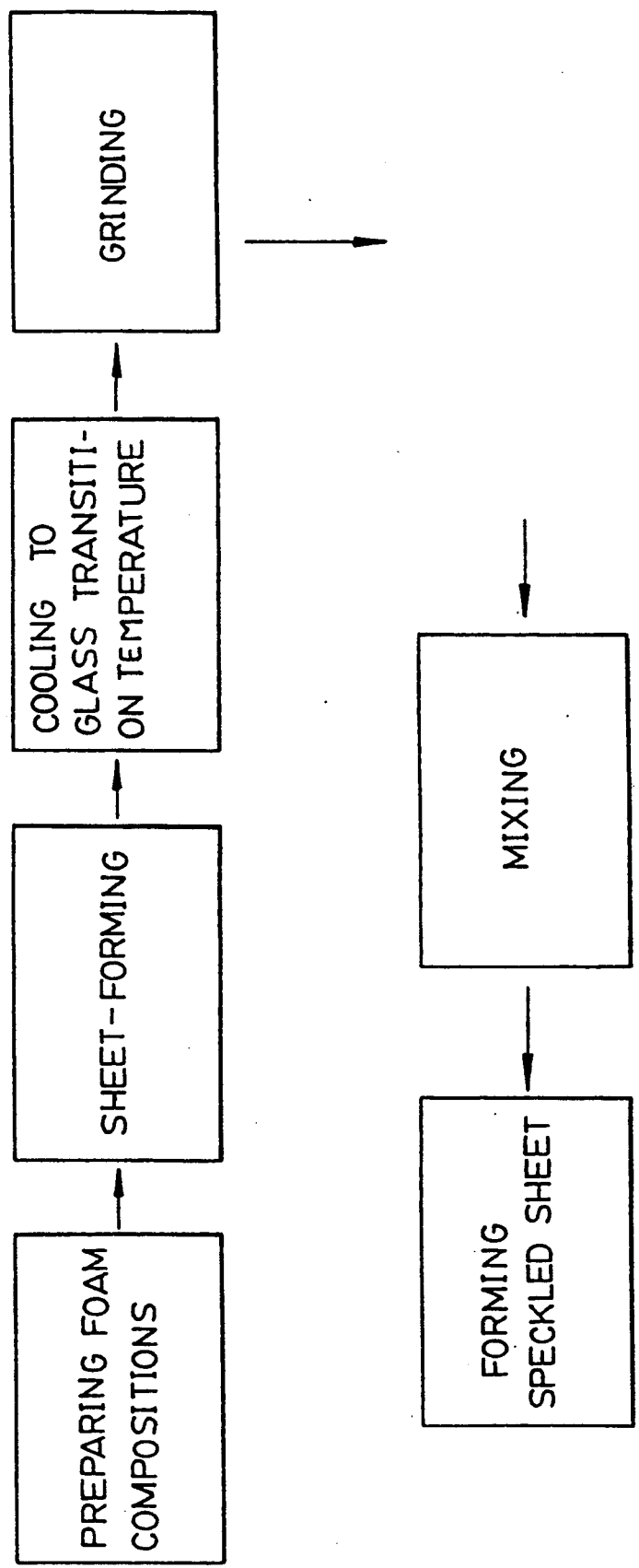
FIG. 1 is a flow diagram illustrating the process of this invention.

Referring to FIG. 1, a preferred embodiment of the process for making a speckled and foamed sheet comprises the following steps:

(a) Two foam compositions are prepared by using polyethylvinylacetate, a foaming agent such as diazocarbon amide and dipentamethylene tetramine, a curing agent such as dicumyl peroxide and coloring agents. The two compositions comprise different coloring agents so that they are differently colored;

(b) The prepared compositions are separately blended and formed into sheets by a conventional sheet-forming process;

(c) The sheets are cooled to a temperature below the glass-transition temperature of polyethylvinylacetate, i.e., below −60 deg C., by using a cooling medium such as liquid nitrogen;

(d) The cooled sheets are separately ground in a grinding device. Since the sheets are at the glass-transition temperatures of EVA, the sheets become glassy and can be easily ground to fine particles;

(e) The ground particles are then sifted through a screen. Preferably, the particle size is about 20–40 meshes;

(f) The screened particles of the two sheets are mixed in an appropriate ratio to form a desired pattern; and (g) Finally, the resulting mixture is formed into a speckled and foamed sheet by a calendering process.

Figure 2:
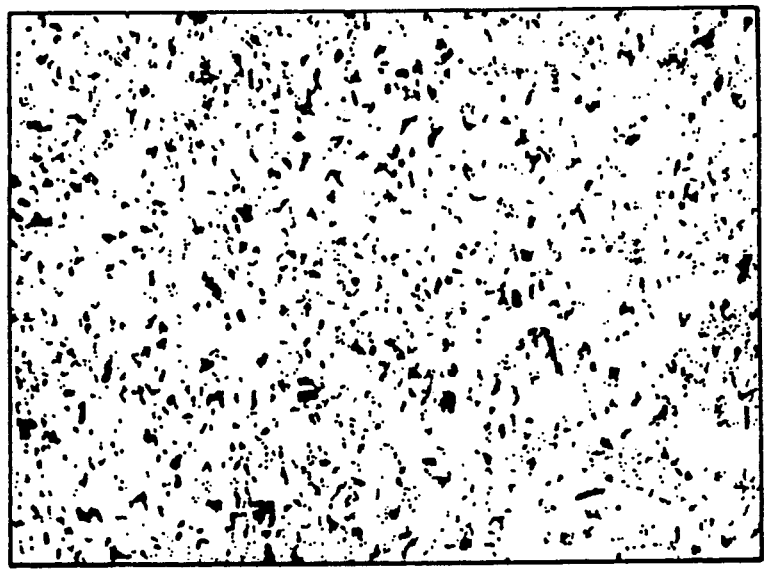
FIG. 2 shows a product sheet obtained by the process of this invention.

FIG. 2 shows a product sheet obtained by the process of this invention. This product sheet has a white background and red speckles.

With the invention thus obtained, it is apparent that various modifications and variations can be made without departing from the scope of the invention. It is therefore intended that the invention be limited only as indicated in the appended claims.

I claim:

1. A process for making speckled and foamed articles, comprising the steps of:

preparing at least two differently colored thermoplastic foam compositions including polyethylvinylacetate;

separately forming at least two differently colored sheets from said foam compositions;

cooling said sheets to below −60 deg C. which is the glass-transition temperature of polyethylvinylacetate;

separately grinding each of said sheets to form fine particles when the temperatures of said sheets are about equal to the glass-transition temperatures thereof;

sifting the ground fine particles through 20-40 mesh screens;

mixing said sifted particles of said differently colored sheets in an appropriate ratio to form a desired pattern; and forming the mixture of said sifted particles into a sheet.

* * * * *